(12) United States Patent
Okamoto et al.

(10) Patent No.: US 11,534,826 B2
(45) Date of Patent: Dec. 27, 2022

(54) METHOD FOR PRODUCING METAL SHAPED ARTICLE HAVING POROUS STRUCTURE

(71) Applicant: Seiko Epson Corporation, Tokyo (JP)

(72) Inventors: Eiji Okamoto, Matsumoto (JP); Ichiro Uechi, Chino (JP)

(73) Assignee: SEIKO EPSON CORPORATION

( * ) Notice: Subject to any disclaimer, the term of this patent is extended or adjusted under 35 U.S.C. 154(b) by 273 days.

(21) Appl. No.: 16/937,789

(22) Filed: Jul. 24, 2020

(65) Prior Publication Data

US 2021/0023624 A1 Jan. 28, 2021

(30) Foreign Application Priority Data

Jul. 25, 2019 (JP) .............................. JP2019-137140

(51) Int. Cl.
  *B22F 3/22* (2006.01)
  *B22F 3/11* (2006.01)
  *B33Y 10/00* (2015.01)
  *B33Y 80/00* (2015.01)
  *B33Y 70/00* (2020.01)
  *B29C 64/10* (2017.01)
  *B29C 64/165* (2017.01)
  *B29C 59/02* (2006.01)

(52) U.S. Cl.
  CPC .............. *B22F 3/1146* (2013.01); *B22F 3/11* (2013.01); *B22F 3/22* (2013.01); *B29C 64/10* (2017.08); *B29C 64/165* (2017.08); *B33Y 10/00* (2014.12); *B33Y 70/00* (2014.12); *B33Y 80/00* (2014.12); *B22F 2202/05* (2013.01); *B22F 2999/00* (2013.01); *B29C 2059/027* (2013.01)

(58) Field of Classification Search
  CPC ........................................................ B22F 3/22
  See application file for complete search history.

(56) References Cited

U.S. PATENT DOCUMENTS

| | | | | |
|---|---|---|---|---|
| 3,751,271 | A * | 8/1973 | Kimura | B01D 39/2034 428/596 |
| 7,401,403 | B2 * | 7/2008 | Xu | H01L 41/331 264/297.6 |
| 10,221,498 | B2 * | 3/2019 | Pascall | C25D 15/00 |
| 2018/0290378 | A1 | 10/2018 | Hakkaku | |
| 2022/0113093 | A1 * | 4/2022 | Pichler | F28D 15/046 |

FOREIGN PATENT DOCUMENTS

| | | |
|---|---|---|
| JP | 2000-239760 A | 9/2000 |
| JP | 2017-071154 A | 4/2017 |

\* cited by examiner

*Primary Examiner* — Christopher S Kessler
(74) *Attorney, Agent, or Firm* — Harness, Dickey & Pierce, P.L.C.

(57) ABSTRACT

A method for producing a metal shaped article having a porous structure includes a mold formation step of forming a mold having a plurality of columnar structures extending from a substrate by performing a resin material supply step of supplying a liquid containing a resin material to a plurality of places of the substrate at intervals in two directions crossing each other, and a curing step of curing the liquid, a sintering target material supply step of supplying a sintering target material to the mold, a removal step of removing the substrate, a degreasing step of degreasing the columnar structures, and a sintering step of sintering the sintering target material.

8 Claims, 5 Drawing Sheets

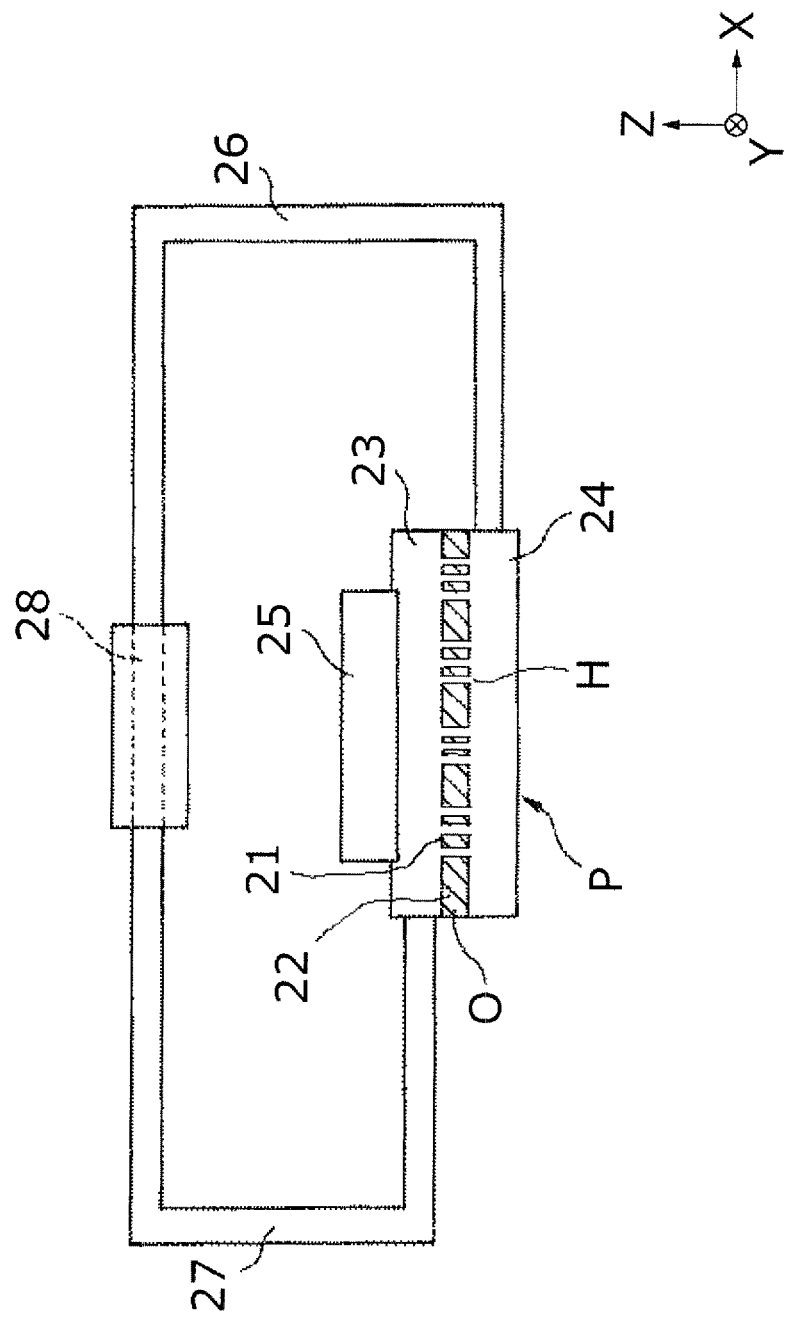

METHOD FOR PRODUCING METAL SHAPED ARTICLE HAVING POROUS STRUCTURE

The present application is based on, and claims priority from JP Application Serial Number 2019-137140, filed on Jul. 25, 2019, the disclosure of which is hereby incorporated by reference herein in its entirety.

BACKGROUND

1. Technical Field

The present disclosure relates to a method for producing a metal shaped article having a porous structure.

2. Related Art

Heretofore, there have been metal shaped articles having various porous structures, that is, metal shaped articles having a porous structure including through-holes penetrating in the thickness direction. As a method for producing such a metal shaped article, a production method such as a sintering method, a dissolved gas casting method, or a processing method using a pulse laser or the like is known. For example, JP-A-2000-239760 (Patent Document 1) discloses, as the dissolved gas casting method, a method for producing a shaped article made of a metal having a porous structure by injecting a gas and also supplying a molten metal to a stock chamber and controlling a gas pressure.

However, in the method for producing a metal shaped article having a porous structure disclosed in Patent Document 1, it is necessary to increase the gas pressure for forming narrow empty holes, however, it is necessary to decrease the gas pressure for achieving a high porosity, and therefore, it is difficult to produce a metal shaped article having a porous structure in which minute empty holes are included in high density. In this manner, in the method for producing a metal shaped article having a porous structure of the related art, a metal shaped article including through-holes penetrating in the thickness direction in high density could not be easily produced.

SUMMARY

A method for producing a metal shaped article having a porous structure according to the present disclosure includes a mold formation step of forming a mold having a plurality of columnar structures extending from a substrate by performing a resin material supply step of supplying a liquid containing a resin material to a plurality of places of the substrate at intervals in two directions crossing each other, and a curing step of curing the liquid, a sintering target material supply step of supplying a sintering target material to the mold, a removal step of removing the substrate, a degreasing step of degreasing the columnar structures, and a sintering step of sintering the sintering target material.

BRIEF DESCRIPTION OF THE DRAWINGS

FIG. 5 is a schematic cross-sectional view showing a loop heat pipe-type heat transfer device including a metal shaped article having a porous structure formed by performing the method for producing a metal shaped article having a porous structure according to one embodiment of the present disclosure.

DESCRIPTION OF EXEMPLARY EMBODIMENTS

Figure 1:
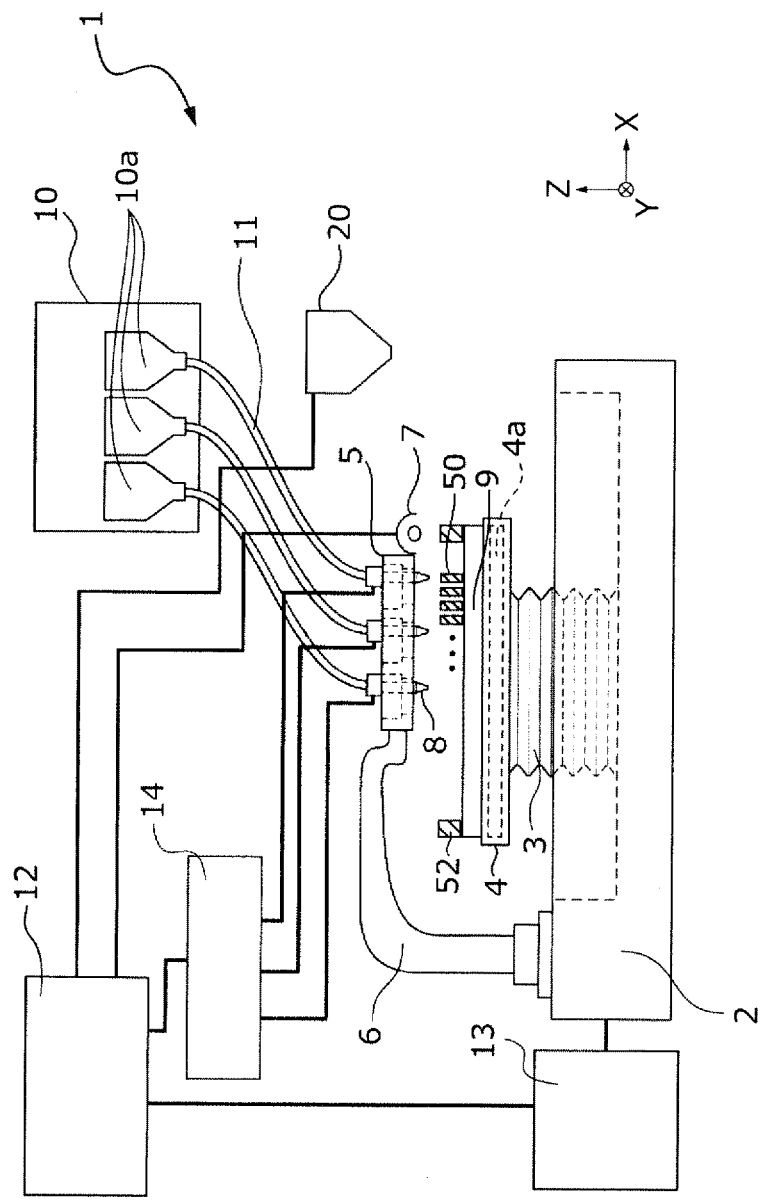
FIG. 1 is a schematic configuration view of one embodiment of a production apparatus for a metal shaped article having a porous structure capable of performing some steps of a method for producing a metal shaped article having a porous structure according to the present disclosure.

First, the present disclosure will be schematically described.

A method for producing a metal shaped article having a porous structure according to a first aspect of the present disclosure for solving the above problem includes a mold formation step of forming a mold having a plurality of columnar structures extending from a substrate by performing a resin material supply step of supplying a liquid containing a resin material to a plurality of places of the substrate at intervals in two directions crossing each other, and a curing step of curing the liquid, a sintering target material supply step of supplying a sintering target material to the mold, a removal step of removing the substrate, a degreasing step of degreasing the columnar structures, and a sintering step of sintering the sintering target material.

According to this aspect, a metal shaped article having a porous structure including through-holes penetrating in the thickness direction can be easily produced by supplying a sintering target material to a mold having a plurality of columnar structures at intervals in two directions crossing each other, degreasing the columnar structures, and also sintering the sintering target material. Then, by forming the columnar structures in high density using, for example, an inkjet method or the like, the metal shaped article having a porous structure including through-holes in high density can be formed.

In a method for producing a metal shaped article having a porous structure according to a second aspect of the present disclosure, in the first aspect, in the resin material supply step, the liquid is ejected and supplied as a liquid droplet from a head.

According to this aspect, by adopting an inkjet method in which a liquid is ejected and supplied as a liquid droplet from a head, the columnar structures can be easily and densely formed.

In a method for producing a metal shaped article having a porous structure according to a third aspect of the present disclosure, in the first or second aspect, the sintering target material is in a paste state by containing a solvent, and a drying step of drying the solvent in the sintering target material is included after the sintering target material supply step.

According to this aspect, the sintering target material can be easily introduced into the substrate using the sintering target material that contains a solvent and is in a paste state, and a structure of the sintering target material in a temporarily fixed state can be easily formed by drying the solvent in the sintering target material.

In a method for producing a metal shaped article having a porous structure according to a fourth aspect of the present disclosure, in any one of the first to third aspects, the sintering target material contains a magnetic powder, and a magnetic field attraction step of generating a magnetic field where the magnetic powder is attracted to the substrate is included during the sintering target material supply step or after the sintering target material supply step.

According to this aspect, by generating a magnetic field so as to attract the sintering target material containing a magnetic powder to the substrate, the sintering target material can be supplied to the mold while suppressing occurrence of a gap.

In a method for producing a metal shaped article having a porous structure according to a fifth aspect of the present disclosure, in any one of the first to third aspects, a pressurization step of pressurizing the sintering target material toward the substrate is included during the sintering target material supply step or after the sintering target material supply step.

According to this aspect, by pressurizing the sintering target material toward the substrate, the sintering target material can be supplied to the mold while suppressing occurrence of a gap.

In a method for producing a metal shaped article having a porous structure according to a sixth aspect of the present disclosure, in any one of the first to fifth aspects, a liquid repellent film is formed at the substrate, and in the resin material supply step, the liquid is supplied onto the liquid repellent film.

According to this aspect, by forming a liquid repellent film at the substrate, the columnar structures to be formed on the substrate can be formed narrow, and the columnar structures can be easily made highly dense.

In a method for producing a metal shaped article having a porous structure according to a seventh aspect of the present disclosure, in the sixth aspect, the liquid repellent film is made of a resin, and in the degreasing step, not only the columnar structures, but also the liquid repellent film is degreased.

According to this aspect, the columnar structures and the liquid repellent film can be simultaneously degreased, and therefore, a burden involved in degreasing can be reduced.

In a method for producing a metal shaped article having a porous structure according to an eighth aspect of the present disclosure, in any one of the first to seventh aspects, in the sintering target material supply step, the sintering target material is supplied to the mold so that a thickness of the sintering target material from the substrate is less than a length of the columnar structure from the substrate.

According to this aspect, the sintering target material is supplied to the mold so that a thickness of the sintering target material from the substrate is less than a length of the columnar structure from the substrate, and therefore, portions where the columnar structures are formed can be made the through-holes penetrating in the thickness direction without performing a post-treatment or the like.

In a method for producing a metal shaped article having a porous structure according to a ninth aspect of the present disclosure, in any one of the first to seventh aspects, in the sintering target material supply step, the sintering target material is supplied to the mold so that a thickness of the sintering target material from the substrate exceeds a length of the columnar structure from the substrate, and a grinding step of grinding the sintering target material at an opposite side of the substrate until the columnar structures are exposed is included before the degreasing step.

According to this aspect, by grinding the sintering target material at an opposite side of the substrate until the columnar structures are exposed, portions where the columnar structures are formed can be made the through-holes reliably penetrating in the thickness direction. Further, by performing grinding before degreasing, a sintering target material piece generated by grinding can be prevented from being mixed in the through-holes.

Hereinafter, embodiments according to the present disclosure will be specifically described with reference to the drawings. First, one embodiment of a production apparatus 1 for a metal shaped article having a porous structure capable of performing some steps of the method for producing a metal shaped article having a porous structure according to the present disclosure will be described with reference to FIGS. 1 and 2. Note that the "three-dimensional shaping" as used herein refers to forming a so-called three-dimensional shaped article, and also includes, for example, forming a shape having a thickness even if it is a flat shape or a so-called two-dimensional shape.

As shown in FIG. 1, the production apparatus 1 for a metal shaped article having a porous structure of this embodiment includes a base stand 2 and a stage 4 provided so as to be movable in the X-axis direction, Y-axis direction, and Z-axis direction shown in the drawing, or drivable in the rotational direction about the Z-axis by a driving device 3 as a driving unit included in the base stand 2. Then, the apparatus includes a head base support portion 6, one end portion of which is fixed to the base stand 2, and the other end portion of which is fixed to a head base 5 for holding a plurality of heads 8, each of which ejects a liquid L (see FIG. 2) containing a resin material.

Here, the liquid L containing a resin material to be used in the production apparatus 1 for a metal shaped article having a porous structure of this embodiment contains a photocurable resin that is cured by irradiation with light. The production apparatus 1 for a metal shaped article having a porous structure includes a light irradiation portion 7 that irradiates light for curing the liquid L. On the stage 4, a substrate 9 at which a metal shaped article O having a porous structure (see FIGS. 4 and 5) is formed is placed. The liquid L is ejected to the substrate 9.

Figure 2:
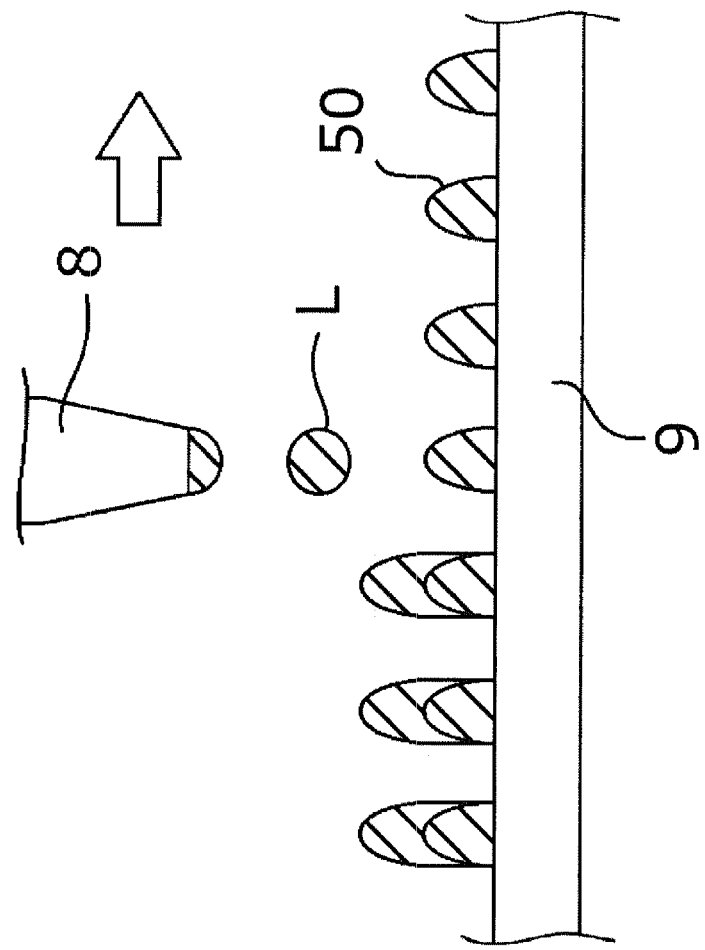
FIG. 2 is a schematic view showing a part of the production apparatus for a metal shaped article having a porous structure in FIG. 1 during formation of columnar structures.

On the stage 4, the substrate 9 at which the metal shaped article O having a porous structure is formed is placed. The liquid L is ejected to the substrate 9. The substrate 9 of this embodiment is a substrate made of a nonmagnetic metal that is tough and is easily produced. However, as the substrate 9, for example, a substrate made of a ceramic can be preferably used. By using the substrate 9 made of a ceramic, high heat resistance can be obtained, and further, the reactivity with the constituent material of the metal shaped article O having a porous structure to be subjected to degreasing, sintering, or the like is also low, and thus, deterioration of the metal shaped article O having a porous structure can be prevented. In FIGS. 1 and 2, a state where columnar structures 50 are formed at the substrate 9 by repeating ejection and curing of the liquid L is shown. In detail, in FIG. 2, a state where the columnar structures 50 extending in the Z-axis direction are formed by ejecting the liquid L at the same positions viewed from the Z-axis direction while relatively moving the head 8 in the direction of the open arrow with respect to the stage 4 is shown. Note that in FIG. 2, a state during the formation of the second stage in the Z-axis direction in the columnar structure 50 is shown, however, the columnar structure 50 may be constituted by any number of stages. The production apparatus 1 for a metal shaped article having a porous structure of this embodiment is configured to form a stacked body of the columnar structure 50 by stacking a plurality of layers in the Z-axis direction by regarding one stage in the Z-axis direction as one layer.

As shown in FIG. 1, each head 8 held by the head base 5 is coupled, via a supply tube 11, to a liquid supply unit 10 including a liquid storage portion 10a storing the liquid L made to correspond to each head 8. In this manner, by including the liquid storage portion 10a corresponding to each head 8, a plurality of different types of liquids L can be supplied from the head base 5. By using the head base 5 having such a configuration, a mold 51 (see FIG. 4) having a plurality of columnar structures 50 extending from the substrate 9 can be formed. Note that it becomes possible to form the columnar structures 50 in high density in a short time by arranging a plurality of nozzles in the head 8 and supplying the liquid L from the plurality of nozzles.

Further, as shown in FIG. 1, the production apparatus 1 for a metal shaped article having a porous structure of this embodiment includes a sintering target material supply portion 20 that supplies a sintering target material M (see FIG. 4) to serve as the constituent material of the metal shaped article O having a porous structure to the mold 51, that is, the substrate 9 at which the columnar structures 50 are provided. The sintering target material supply portion 20 of this embodiment is a hopper capable of storing and discharging the sintering target material M, but there is no particular limitation on the configuration of the sintering target material supply portion 20. The mold 51 to which the sintering target material M is supplied is subjected to degreasing and sintering using a heating device or the like that is an external device. Here, it is preferred to form an outer wall portion 52 with the liquid L along the outline portion of the substrate 9 as the columnar structures 50 are formed so that the sintering target material M does not fall out of the substrate 9 when the sintering target material M is supplied to the substrate 9, (see FIG. 1). Further, a magnet 4a is included in the stage 4, so that the filling accuracy of the sintering target material M in the mold 51 is enhanced when a magnetic substance is used as the sintering target material M.

The production apparatus 1 for a metal shaped article having a porous structure is provided with a control unit 12 that controls the respective constituent portions such as the stage 4, the head base 5, the head 8, the light irradiation portion 7, and the sintering target material supply portion 20 based on the data for shaping the metal shaped article O having a porous structure output from, for example, a data output device such as a personal computer (not shown). By the control of the control unit 12, the stage 4, the head base 5, the head 8, the light irradiation portion 7, the sintering target material supply portion 20, and the like are driven in conjunction with one another. The control unit 12 of this embodiment includes one or more processors, a storage device, and an interface for performing signal input/output to/from the outside. Then, the control unit 12 of this embodiment causes the respective constituent portions to execute an operation of producing the metal shaped article O having a porous structure by execution of a program or a command read on the storage device by the processor. The control unit 12 may be constituted, not by a computer, but by combining a plurality of circuits.

Based on the control signal from the control unit 12, a signal for controlling the start and stop of the movement, moving direction, moving amount, moving speed, or the like of the stage 4 is generated in a stage controller 13. The signal is transmitted to the driving device 3 included in the base stand 2, and the stage 4 moves in the X-axis direction, Y-axis direction, and Z-axis direction. In the head 8, based on the control signal from the control unit 12, an ejection signal for the liquid L is generated, and based on the generated ejection signal, the head controller 14 controls the driving of each head 8, thereby ejecting the liquid L.

Next, the composition of a preferred liquid L will be described. The liquid L contains a resin material. As the resin material, for example, as a photocurable resin, an acrylic resin, a methacrylic resin, an epoxy resin, or a urethane resin, as a thermoplastic resin, an ABS resin, a PC resin, or a PP resin, as a thermosetting resin, an epoxy resin or the like can be preferably used. Further, it may contain a solvent, and as the solvent, diethylene glycol monobutyl ether acetate (CAS No: 124-17-4), or the like can be preferably used.

Next, a preferred sintering target material M will be described. As the sintering target material M, for example, magnesium (Mg), iron (Fe), cobalt (Co), chromium (Cr), aluminum (Al), titanium (Ti), copper (Cu), nickel (Ni), or a mixture such as an alloy containing one or more of these metals (a maraging steel, a stainless steel, cobalt chromium molybdenum, a titanium alloy, a nickel alloy, an aluminum alloy, a cobalt alloy, or a cobalt chromium alloy), or a ceramic such as silicon dioxide, titanium dioxide, aluminum oxide, or zirconium oxide can be preferably used. Further, the material may be in a paste state, a slurry state, or the like containing a solvent such as propylene glycol, water, or butanediol or a binder resin such as polyvinyl alcohol (PVA), polyvinylpyrrolidone (PVP), or a starch (amylose or amylopectin) in addition thereto.

Next, one example of the method for producing a metal shaped article having a porous structure to be performed using the production apparatus 1 for a metal shaped article having a porous structure will be described with reference to the flowchart of FIG. 3 and FIGS. 4 and 5.

Figure 3:
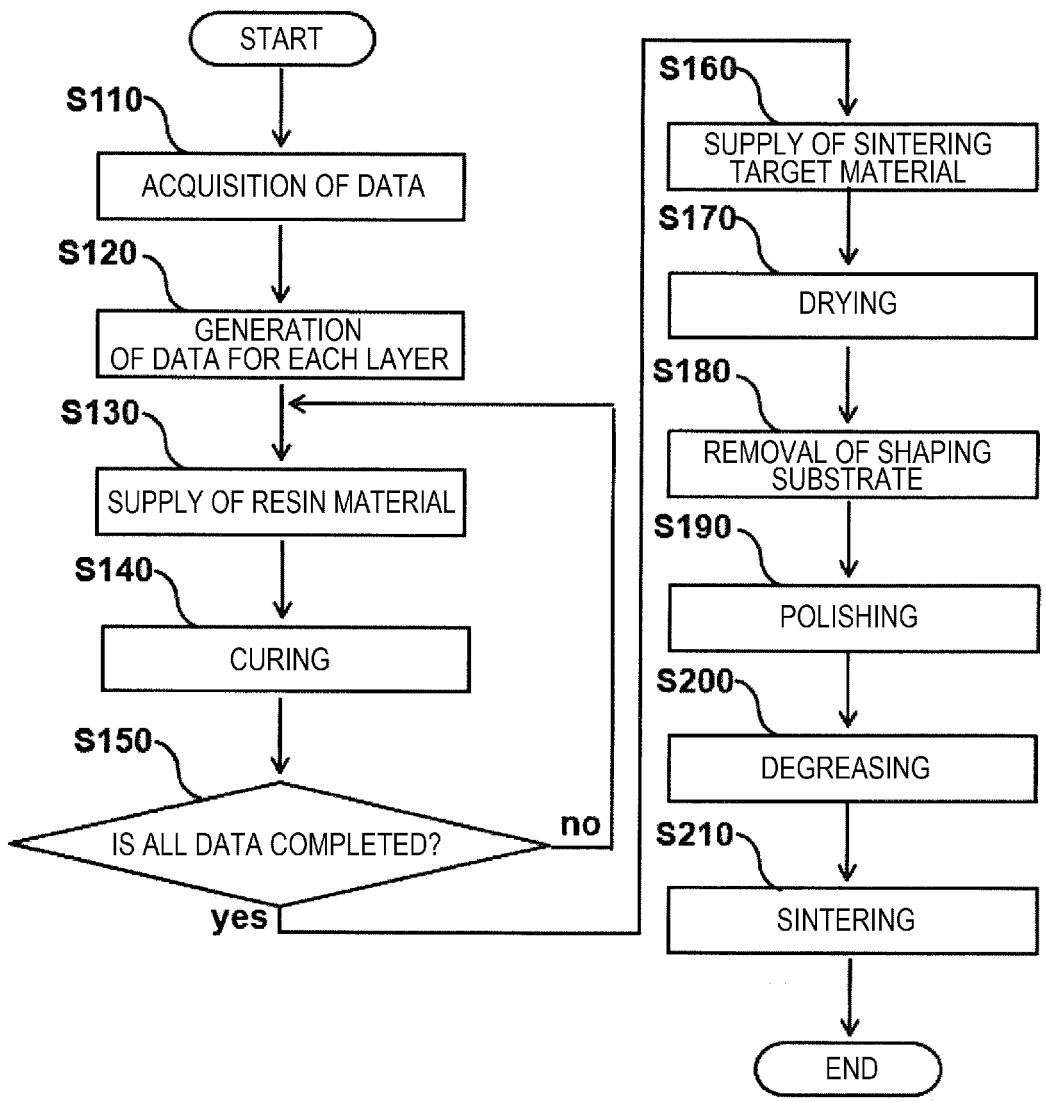
FIG. 3 is a flowchart of a method for producing a metal shaped article having a porous structure according to one embodiment of the present disclosure.

As shown in FIG. 3, in the method for producing a metal shaped article having a porous structure of this embodiment, first, in Step S110, data of the metal shaped article O having a porous structure to be produced is acquired. In detail, for example, from an application program or the like executed in a personal computer, data representing the shape of the metal shaped article O having a porous structure are acquired.

Subsequently, in Step S120, by the control of the control unit 12, data for each layer are generated. In detail, the data representing the shape of the metal shaped article O having a porous structure are sliced according to the shaping resolution in the Z-axis direction, whereby cross-sectional data that are bit map data are generated for each cross section.

Subsequently, in a resin material supply step of Step S130, by the control of the control unit 12, the liquid L containing a resin material is ejected from the head 8 based on the cross-sectional data generated in Step S120, whereby the columnar structures 50 based on the cross-sectional data are formed at the substrate 9. Here, the ejection positions of the liquid L with respect to the substrate 9, that is, the forming positions of the columnar structures 50 are positions at intervals in both the X-axis direction and the Y-axis direction, that is, staggered arrangement. When expressed in another way, in this Step S130, the liquid L containing a resin material is supplied to a plurality of places of the substrate 9 at intervals in two directions crossing each other. In this Step S130, it is preferred to also form the outer wall portion 52 together with the columnar structures 50 at the substrate 9.

Subsequently, in a curing step of Step S140, by the control of the control unit 12, the liquid L is cured by irradiating light such as ultraviolet light from the light irradiation portion 7. In the method for producing a metal shaped article having a porous structure of this embodiment, the liquid L containing a photocurable resin as the resin material is used, and therefore, a light irradiation step of irradiating light from the light irradiation portion 7 is adopted, however, depending on the resin material to be used, a step different from the light irradiation step can be adopted as the curing step. For example, when the liquid L containing a thermosetting resin as the resin material is used, a heating step may be adopted as the curing step. Further, when the liquid L containing a thermoplastic resin as the resin material is used, a cooling step may be adopted as the curing step. In the method for producing a metal shaped article having a porous structure of this embodiment, the resin material supply step of Step S130 and the curing step of Step S140 constitute a mold forming step of forming the mold 51 having the plurality of columnar structures 50 extending from the substrate 9. By repeating the mold forming step, for example, the mold 51 having the columnar structures 50 in which the aspect ratio that is the ratio of the diameter of the columnar structure 50 when viewed from the Z-axis direction and the length of the columnar structure 50 in the Z-axis direction is 10 or more can be formed.

Then, in Step S150, by the control of the control unit 12, Step S130 to Step S150 are repeated until shaping of the structure of the metal shaped article O having a porous structure based on the bit map data corresponding to the respective layers generated in Step S120 is completed, whereby the mold 51 is formed. The uppermost view in FIG. 4 shows the mold 51, which is completed by repeating Step S130 to Step S150, and in which the plurality of columnar structures 50 are formed at the substrate 9, and also the outer wall portion 52 is formed along the outline portion of the substrate 9.

When the mold 51 is formed by repeating Step S130 to Step S150, in a sintering target material supply step of Step S160, by the control of the control unit 12, the sintering target material M is supplied to the mold 51 from the sintering target material supply portion 20. The second view from the top in FIG. 4 shows a state where this Step S160 is performed, and the sintering target material M is supplied to the mold 51. Then, after performing the sintering target material supply step of Step S160, in a drying step of Step S170, the solvent contained in the sintering target material M is dried. The sintering target material M of this embodiment contains a solvent, and therefore, this Step S170 is performed, however, when the sintering target material M that does not contain a solvent is used, this Step S170 can be omitted.

Subsequently, in a removal step of Step S180, the substrate 9 is removed. In this Step S180, the outer wall portion 52 is also removed along with the removal of the substrate 9. The third view from the top in FIG. 4 shows a state where this Step S180 is performed, and the substrate 9 is removed, and also the outer wall portion 52 is removed. However, the outer wall portion 52 may not be removed in this Step S180, and may be degreased together with the columnar structures 50 in a degreasing step of Step S200 described later.

Subsequently, in a grinding step of Step S190, an upper face portion Mu of the structure of the metal shaped article O having a porous structure resulting from the removal of the substrate 9 and the outer wall portion 52 in Step S180 is ground until the columnar structures 50 appear. However, this Step S190 can also be omitted according to the supply state of the sintering target material M, or the like.

Then, in a degreasing step of Step S200, the columnar structures 50 are degreased using, for example, a heating device (not shown) or the like, and in a sintering step of Step S210, sintering of the sintering target material M is performed by heating the structure of the metal shaped article O having a porous structure using the heating device or the like. Then, with the completion of Step S210, the method for producing a metal shaped article having a porous structure of this embodiment is completed. The removal step of Step S180 may be performed after the degreasing step of Step S200 or the like according to the type of the metal shaped article O having a porous structure to be produced.

Figure 4:
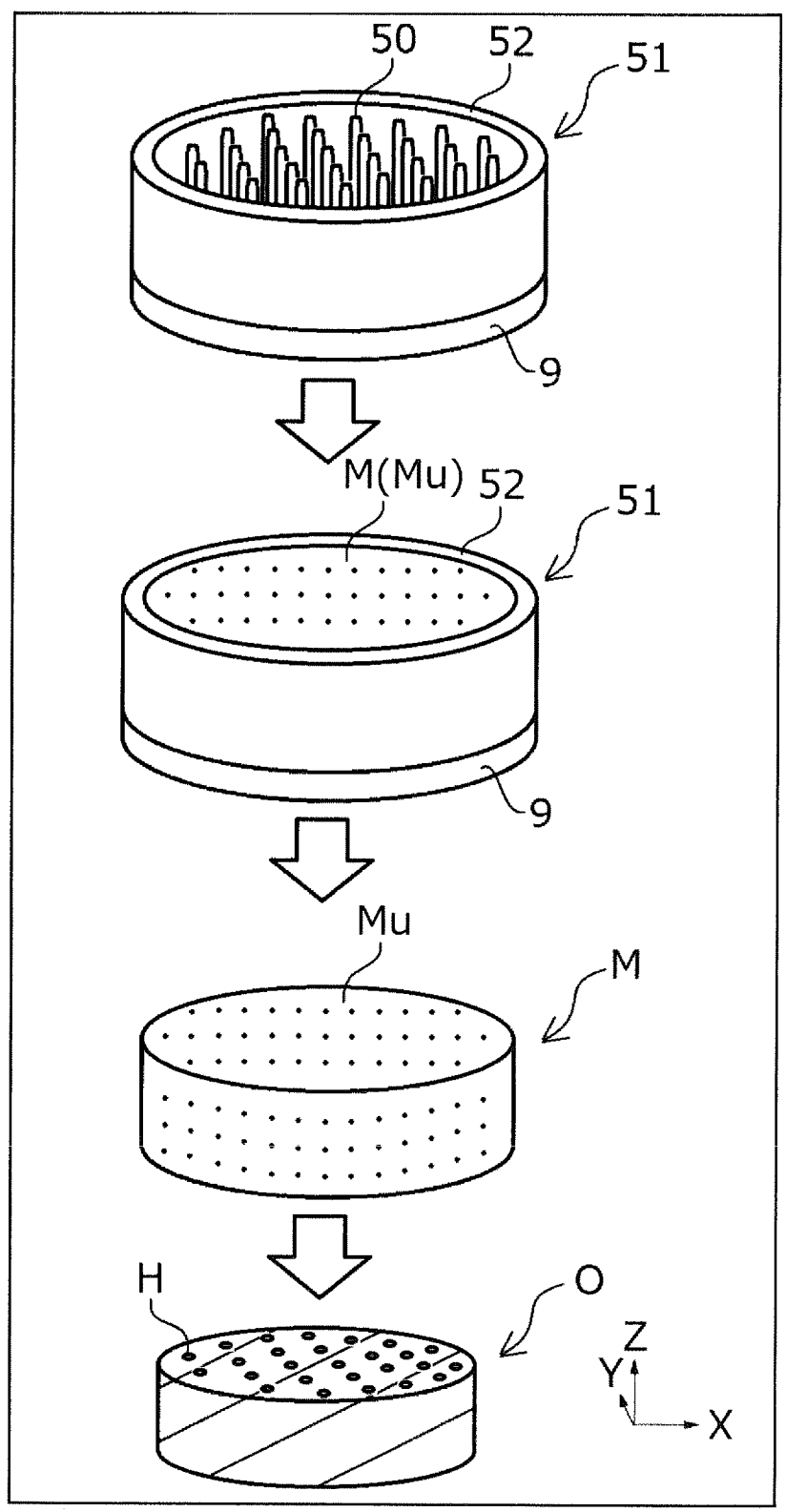
FIG. 4 is a schematic view for illustrating the method for producing a metal shaped article having a porous structure according to one embodiment of the present disclosure.

The lowermost view in FIG. 4 shows a sintered body of the metal shaped article O having a porous structure in which a plurality of through-holes H penetrating in the Z-axis direction are formed corresponding to the positions where the columnar structures 50 are formed after performing Step S200 and Step S210. As can be understood by comparison of the third view from the top in FIG. 4 with the lowermost view in FIG. 4, by performing the sintering step of Step S210, the metal shaped article O having a porous structure is shrunk. By utilizing such shrinkage, the through-holes H can be arranged in particularly high density. When the outer wall portion 52 is not removed in the removal step of Step S180, the outer wall portion 52 is degreased together with the columnar structures 50 in the degreasing step of Step S200.

FIG. 5 is a schematic cross-sectional view showing a loop heat pipe-type heat transfer device P including the metal shaped article O having a porous structure formed by performing the method for producing a metal shaped article having a porous structure of this embodiment. The loop heat pipe-type heat transfer device P shown in FIG. 5 is a device for cooling a heat source 25 such as a semiconductor chip. The loop heat pipe-type heat transfer device P shown in FIG. 5 includes a housing in which a bottom face is disposed so as to enable heat transfer with the heat source 25, a steam pipe 27, a liquid pipe 26, and a condenser 28. In the housing, the porous metal shaped article O having a porous structure is placed, and an evaporation chamber 23 and a liquid chamber 24 communicate with each other through the through-holes H. At that time, the bottom face of the loop heat pipe-type heat transfer device P forms a part of the evaporation chamber 23. The steam pipe 27 is coupled to the evaporation chamber 23 and the condenser 28, and the liquid pipe 26 is coupled to the liquid chamber 24 and the condenser 28. It includes a low-density portion 21 that is the metal shaped article O having a porous structure with a plurality of through-holes H produced as described above and a plurality of columnar high-density portions 22. The low-density portion 21 and the high-density portions 22 are configured to be coupled to each other. It may be configured to have the through-holes H entirely.

Cooling water supplied to the liquid chamber 24 from the liquid pipe 26 is introduced into the evaporation chamber 23 through the through-holes H by a capillary phenomenon. The cooling water introduced into the evaporation chamber 23 is converted to steam in the evaporation chamber 23 by the heat of the heat source 25. When the cooling water is converted to steam in the evaporation chamber 23, heat is taken from the heat source 25 due to vaporization heat. In this manner, the loop heat pipe-type heat transfer device P shown in FIG. 5 cools the heat source 25. The vaporized steam flows in the condenser 28 through the steam pipe 27 and is liquified again by being cooled in the condenser 28. The more densely the through-holes H are provided, the more efficiently cooling water can move through the through-holes H. In addition, the more minute the through-holes H are, the more efficiently the capillary phenomenon occurs. Therefore, the metal shaped article O having a porous structure including the through-holes H with a narrow diameter in high density is desired.

As described above, the method for producing a metal shaped article having a porous structure of this embodiment includes the mold formation step of forming the mold 51 having the plurality of columnar structures 50 extending in the Z-axis direction from the substrate 9 by performing the resin material supply step of Step S130 of supplying the liquid L containing a resin material to a plurality of places of the substrate 9 at intervals in two directions crossing each other, and the curing step of Step S140 of curing the liquid L. The method further includes the sintering target material supply step of Step S160 of supplying the sintering target material M to the mold 51, the removal step of Step S180 of removing the substrate 9, the degreasing step of Step S200 of degreasing the columnar structures 50, and the sintering step of Step S210 of sintering the sintering target material M. By performing the method for producing a metal shaped article having a porous structure of this embodiment, the sintering target material M is supplied to the mold 51 having the plurality of columnar structures 50 at intervals in two directions crossing each other, the columnar structures 50 are degreased, and also the sintering target material M is sintered, whereby the metal shaped article O having a porous structure including the through-holes H penetrating in the thickness direction can be easily produced.

Here, the head 8 in the production apparatus 1 for a metal shaped article having a porous structure is a head employing an inkjet method for ejecting the liquid L as a liquid droplet. That is, in the method for producing a metal shaped article having a porous structure of this embodiment, in the resin material supply step of Step S130, the liquid L is ejected and supplied as a liquid droplet from the head 8. In this manner, by adopting an inkjet method for ejecting and supplying the liquid L as a liquid droplet from the head 8, the columnar structures 50 can be easily and densely formed.

Here, the resin material supply step of Step S130 may be performed using, for example, a microneedle or the like for ejecting the liquid L in a liquid columnar shape without using the head employing an inkjet method for ejecting the liquid L as a liquid droplet. However, when the columnar structures 50 are formed using a microneedle or the like, the diameters of the columnar structures 50 when viewed from the Z-axis direction hardly become uniform, and further, it is difficult to form the columnar structures 50 in high density as compared with the case where the head employing an inkjet method is used, and therefore, it is particularly preferred to use the head employing an inkjet method.

The sintering target material M to be used in the method for producing a metal shaped article having a porous structure of this embodiment is in a paste state by containing a solvent, and the drying step of Step S170 of drying the solvent in the sintering target material M is included after the sintering target material supply step of Step S160. That is, by performing the method for producing a metal shaped article having a porous structure of this embodiment, the sintering target material M can be easily introduced into the substrate 9 using the sintering target material M that contains a solvent and is in a paste state, and the structure of the sintering target material M in a temporarily fixed state before sintering can be easily formed by drying the solvent in the sintering target material M.

As described above, in the production apparatus 1 for a metal shaped article having a porous structure of this embodiment, the magnet 4a is included in the stage 4. Then, in the method for producing a metal shaped article having a porous structure of this embodiment, the sintering target material M containing a magnetic powder of, for example, stainless steel (SUS) or the like can be used. That is, the method for producing a metal shaped article having a porous structure of this embodiment can be expressed such that the sintering target material M contains a magnetic powder, and a magnetic field attraction step of generating a magnetic field where the magnetic powder in the sintering target material M is attracted to the substrate 9 is included during the sintering target material supply step of Step S160 or after the sintering target material supply step of Step S160. In this manner, by generating a magnetic field so as to attract the sintering target material M containing a magnetic powder to the substrate 9 during the sintering target material supply step of Step S160 or after the sintering target material supply step of Step S160, the sintering target material can be supplied to the mold 51 while suppressing occurrence of a gap. The magnet 4a of this embodiment is a thin cylindrical magnet, however, the shape of the magnet is not particularly limited as long as the shape enables the formation of the lines of magnetic force toward the substrate 9, and for example, a ring-shaped magnet surrounding the stage 4 from the circumference thereof, or the like can also be used.

Here, a preferred magnetic field attraction step will be described in detail. For example, a preferred magnetic field attraction step can be performed using the sintering target material M containing a SUS powder having an average particle diameter of 4 μm, PVA as a binder, and propylene glycol as a solvent, and also using a cylindrical or ring-shaped ferrite magnet or neodymium magnet configured to make the magnetic flux density on the stage 4 substantially uniform. As the stage 4 or the substrate 9, non-magnetic austenitic stainless steel, a ceramic, or the like can be preferably used.

A pressurization step of pressurizing the sintering target material M toward the substrate 9 may also be performed during the sintering target material supply step of Step S160 or after the sintering target material supply step of Step S160 in place of the magnetic field attraction step. This is because also by pressurizing the sintering target material M toward the substrate 9, the sintering target material M can be supplied to the mold 51 while suppressing occurrence of a gap.

Here, it is preferred to use a substrate having a liquid repellent film formed at the surface thereof as the substrate 9. This is because, in the resin material supply step of Step S130, by supplying the liquid L onto the liquid repellent film, the liquid L can be prevented from spreading too wide on the substrate 9, and the columnar structures 50 to be formed on the substrate 9 can be formed narrow, and the columnar structures 50 can be easily made highly dense. By forming the liquid repellent film at the surface of the substrate 9, a decrease in adhesion strength between the substrate 9 and the columnar structure 50 can also be suppressed. Therefore, it becomes easy to carry the structure of the metal shaped article O having a porous structure during production.

In particular, it is preferred to use the substrate 9 at which the liquid repellent film made of a resin is formed. This is because, in the degreasing step of Step S200, not only the columnar structures 50, but also the liquid repellent film can be degreased simultaneously, and therefore, a burden involved in degreasing can be reduced.

In the method for producing a metal shaped article having a porous structure of this embodiment, in the sintering target material supply step of Step S160, the sintering target material M is supplied to the mold 51 so that the thickness of the sintering target material M from the substrate 9 exceeds the length of the columnar structure 50 from the substrate 9. Then, by performing the grinding step of Step S190 before the degreasing step of Step S200, the upper face portion Mu of the sintering target material M, that is, at the opposite side of the substrate 9 is ground until the columnar structures 50 appear. In this manner, the portions where the columnar structures 50 are formed are made the through-holes H reliably penetrating in the thickness direction. Incidentally, by performing grinding before degreasing, a sintering target material piece generated by grinding can be prevented from being mixed in the through-holes H.

However, instead of performing the grinding step of Step S190, a cutting step of cutting the sintering target material M at the opposite side of the substrate 9 along the X-axis direction and the Y-axis direction. The cutting step can be performed by, for example, wire electric discharge machining or the like.

On the other hand, in the sintering target material supply step of Step S160, a post-treatment such as the grinding step or the cutting step can be omitted by supplying the sintering target material M to the mold 51 so that the thickness of the sintering target material M from the substrate 9 is less than the length of the columnar structure 50 from the substrate 9. This is because when the sintering target material M is supplied to the mold 51 so that the thickness of the sintering target material M from the substrate 9 is less than the length of the columnar structure 50 from the substrate 9, even if such a post-treatment or the like is not performed, portions where the columnar structures 50 are formed can be made the through-holes H penetrating in the thickness direction.

The present disclosure is not limited to the above-mentioned embodiments, but can be realized in various configurations without departing from the gist of the present disclosure. For example, the technical features in the embodiments corresponding to the technical features in the respective aspects described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A method for producing a metal shaped article having a porous structure, comprising:
    placing a substance on a stage;
    forming a mold having a plurality of columnar structures extending from the substrate by:
        ejecting a liquid from a head as a liquid droplet containing a resin material to a plurality of places of the substrate at intervals in two directions crossing each other, and
        curing the liquid;
    supplying a target material to the mold, the target material being one of:
        magnesium (Mg), iron (Fe), cobakt (Co), chromium (Cr), aluminium (Al), titanium (Ti), copper (Cu), nickel (Ni); or
        a mixture containing one or more of the magnesium (Mg), iron (Fe), cobalt (Co), chromium (Cr), aluminium (Al), titanium (Ti), copper (Cu), and nickel (Ni);
    removing the substrate from the stage;
    degreasing the columnar structures with an external heating device; and
    sintering the target material with the external heating device to produce the metal shape article.

2. The method for producing a metal shaped article having a porous structure according to claim 1, wherein
    the target material is in a paste state containing a solvent, and
    further comprising drying the solvent in the target material after the ejecting of the target material to the substrate.

3. The method for producing a metal shaped article having a porous structure according to claim 1, wherein
    the target material contains a magnetic powder, and
    further comprising generating a magnetic field that attracts the magnetic powder to the substrate during or after the ejecting of the target material to the substrate.

4. The method for producing a metal shaped article having a porous structure according to claim 1, further comprising:
    pressurizing the target material toward the substrate during or after the ejecting of the target material to the substrate.

5. The method for producing a metal shaped article having a porous structure according to claim 1, further comprising
    forming a liquid repellent film on the substrate, and
    wherein the liquid is ejected onto the liquid repellent film.

6. The method for producing a metal shaped article having a porous structure according to claim 5, wherein
    the liquid repellent film is made of a resin, and
    during the degreasing of the columnar structures, the liquid repellent film is also degreased.

7. The method for producing a metal shaped article having a porous structure according to claim 1, wherein
    the target material is supplied to the mold during the ejecting od the liquid so that a thickness of the target material from the substrate is less than a length of the columnar structure from the substrate.

8. The method for producing a metal shaped article having a porous structure according to claim 1, wherein
    the target material is supplied to the mold during the ejecting of the liquid so that a thickness of the target material from the substrate exceeds a length of the columnar structure from the substrate, and
    further comprising grinding the target material at an opposite side of the substrate until the columnar structures are exposed before the degreasing of the columnar structures.

* * * * *